US007938247B2

(12) United States Patent
Kujat et al.

(10) Patent No.: US 7,938,247 B2
(45) Date of Patent: May 10, 2011

(54) VIRTUAL LUG LOADER

(75) Inventors: Darryl Kujat, Salmon Arm (CA); Douglas Foster, Salmon Arm (CA); Darren Ross, Salmon Arm (CA)

(73) Assignee: USNR/Kockums Cancar Company, Vancouver, WA (US)

( * ) Notice: Subject to any disclaimer, the term of this patent is extended or adjusted under 35 U.S.C. 154(b) by 0 days.

(21) Appl. No.: 12/534,777

(22) Filed: Aug. 3, 2009

(65) Prior Publication Data

US 2010/0059336 A1 Mar. 11, 2010

Related U.S. Application Data

(63) Continuation of application No. 12/068,491, filed on Feb. 7, 2008, now Pat. No. 7,578,382.

(60) Provisional application No. 60/899,871, filed on Feb. 7, 2007.

(51) Int. Cl.
*B65G 47/24* (2006.01)

(52) U.S. Cl. ................... 198/415; 198/460.1; 198/461.1

(58) Field of Classification Search ............... 198/460.1, 198/461.1, 461.2, 464.1, 464.3, 415
See application file for complete search history.

(56) References Cited

U.S. PATENT DOCUMENTS 3,084,090 A * 4/1963 Rambo et al. ................ 198/415
3,944,049 A 3/1976 Graybill
4,077,524 A 3/1978 Rysti
4,144,976 A 3/1979 Rysti
4,154,043 A 5/1979 Heide
4,197,935 A 4/1980 Aterianus et al.
4,330,055 A 5/1982 Lunden
4,372,438 A 2/1983 Hayashi
4,638,440 A 1/1987 Brough et al.
4,807,739 A * 2/1989 Wolf et al. .................... 198/415
4,869,360 A * 9/1989 Brown et al. ............. 198/460.1
4,967,899 A 11/1990 Newsome
5,341,915 A 8/1994 Cordia et al.
5,419,425 A 5/1995 Goater
5,617,910 A 4/1997 Hill
5,660,262 A * 8/1997 Landrum et al. ............. 198/415
(Continued)

OTHER PUBLICATIONS http://www.baldormotion.com/products/mint/mintmt.asp—Mint Automation Software and Applications, Literature No. BR1202-B, p. 8, Feb. 2010.
Rexroth Bosch Group, Drive & Control Profile, 2003 Bosch Rexroth Corporation, Form: Campbell-Hardage—2003 (0703)—www.boschrexroth-us.com.
http://www.krakenautomation.com/prod_InfeedTransfer_SmartBelt—Kraken Automation, Servo Smart-Belt Infeeds & Transfers pp. 1 and 2, dated Jul. 21, 2006.
(Continued)

*Primary Examiner* — James R Bidwell
(74) *Attorney, Agent, or Firm* — Schwabe, Williamson & Wyatt

(57) ABSTRACT

A virtual lug loader includes a lug loader for loading workpieces in a flow direction into the spaced apart lugs on a lugged conveyor, wherein the workpieces are transversely oriented relative to the flow direction. The lug loader includes an array of pairs of endless conveyors for conveying the workpieces downstream, wherein each pair of endless conveyors in the array include first and second endless conveyors. The first and second endless conveyors are spaced laterally apart across the flow direction. Each are aligned substantially in the flow direction. The array forms a continuous upper surface in the flow direction for supporting the workpieces translating downstream in the flow direction. Each pair of endless conveyors in the array overlap adjacent pairs of endless conveyors in the array. At least one pair of endless conveyors in the array include independently actuable first and second drives independently driving their corresponding first and second endless conveyors.

12 Claims, 3 Drawing Sheets

U.S. PATENT DOCUMENTS 5,662,203 A 9/1997 St. Pierre et al.
5,813,512 A 9/1998 Andersson et al.
5,921,376 A 7/1999 Michell et al.
6,095,316 A * 8/2000 Redden ......................... 198/415
6,189,682 B1 2/2001 Hill
6,199,683 B1 3/2001 Michell et al.
6,964,330 B2 11/2005 Kujat et al.
7,578,382 B2 * 8/2009 Kujat et al. ................ 198/461.1

OTHER PUBLICATIONS http://www.ultimizers.com/narrowboard.html—Ultimizers Inc., dated Jul. 21, 2006, pp. 1 and 2.

* cited by examiner

FLOW
A
18
16
20
10
12
14
22
24
26
28
30
36
38
40
42
44
46
48
50
32
32a
G
L
C
SKID 14
32a
SKID
50
46
44
42
40
38
14'
α
36
34
30
28
26
24
22
22a
$V_5$
$V_4$
$V_3$
$V_2$
$V_1$
$V_0$
12
10
16
20
A
FLOW

VIRTUAL LUG LOADER

CROSS REFERENCE TO RELATED APPLICATION

The present application is a continuation of U.S. patent application Ser. No. 12/068,491, filed on Feb. 7, 2008, now U.S. Pat. No. 7,578,382, entitled VIRTUAL LUG LOADER, which in turn claims priority from U.S. Provisional Patent Application No. 60/899,871 filed Feb. 7, 2007 entitled VIRTUAL LUG LOADER.

FIELD OF THE INVENTION

This invention relates to an apparatus for the singulation or allocation of lumber into lug spaces on a lugged transfer, or other lumber conveying device, and in particular relates to an apparatus capable of collecting, singulating, straightening, allocating and consistently spacing, rough sawn lumber or planed finished lumber, or sticks of varying widths, thickness and lengths into consecutive spaced-apart lugs, or allocated spacings onto a transfer, or lugged transfer, or to a stick placing device, at high speeds.

BACKGROUND OF THE INVENTION

Conventional lug loaders or singulators (hereinafter collectively referred to as either lug loaders or singulators) have been found to be inadequate at higher feed speeds. They are also limited in their ability to both singulate and allocate lumber. When lumber is of varying widths and varying in thickness, or bowed, as may be predominant in curve sawing mills, cupped or crooked, and/or skewed on the transfer, it becomes increasingly difficult to handle the lumber at desirable higher speeds.

An example of a conventional lug loader is that taught in U.S. Pat. No. 3,923,142 which issued to Rysti on Dec. 2, 1975. In particular, what is being taught is singulating boards by use of supporting arms rotating around a closed loop, the orientation of the supporting arms controlled by curved deflectors. Pressing arms in opposed radial pairs, are rotatably mounted above the supporting arm to synchronously clamp a board onto a supporting arm. Downstream flow of the mat of boards is arrested by a stop on each supporting arm. Rysti does not disclose a mechanism for straightening lumber which is skewed on the infeed transfer in the lug loader.

Applicants are also aware of U.S. Pat. No. 5,518,106, which issued to Allard on May 21, 1996. Allard discloses using fixed pick-up shoes mounted onto rotating discs for engaging and supporting boards being singulated. Fixed shoes however, have the disadvantage that they may mark the underside of the board as the board is translated over the top of the disc and as the board is released. If a board is finished, for example destined for cabinet making or the like, then any marks from the shoe or overhead clamp will reduce the value of the board. Allard also discloses a speed-up belt to pull the board away from the fixed shoes at the top of the disc to prevent the board from being flipped over as the board is released from the shoes. In some mills the boards have been marked for trimming and grading before the lug loader. Thus if the board has been flipped over by the singulator, as may occur in the case of the Allard device, the board must be flipped back by hand to read the mark. This can be difficult in a high speed application.

Many lug loaders in the prior art, particularly those operating at slower feed speeds, require that, in order to stop the delivery of boards to the singulator, the board mat moving downstream into the singulator device must be pushed back upstream by the stopping means, that is forced away from, for example, the fixed pick-up shoe and clamping device. Worse yet, in some prior art devices the board delivery mechanism must be brought to a complete stop. Both pushing the mat of boards back upstream, and stopping the board delivery mechanism, can be impractical at high speed.

In the prior art applicant is also aware of U.S. Pat. Nos. 5,921,376 and 6,199,683 which issued to Michell et al for, respectively, a High Speed Revolving Lug Loader With Retracting Heel and Hook and a High Speed Revolving Board Singulator With Retracting Shoe and Variable Dwell Duckers, both of which describe the mechanical manipulation of boards to load the boards into individual lug spaces in a lugged outfeed transfer.

Applicant is also aware of the following U.S. Pat. Nos. in the prior art relating to the present invention: 4,077,524; 4,144,976; 4,330,055; 4,638,440; 4,869,360; 5,419,425; 5,662,203; and 5,813,512.

SUMMARY OF THE INVENTION

The proposed invention is a transfer system. The transfer system makes use of conveyors such as chains or belts to move lumber pieces downstream while oriented traversely across the flow path. The lumber pieces enter the virtual lug loading system according to the present invention moving transversely. The lumber pieces may enter as a tightly spaced sheet or mat of pieces with no gaps, or the lumber pieces may be randomly spaced and oriented.

Within the system a first grouping of transfers create consistent gaps between individual lumber pieces. The speed with which the lumber pieces are translated downstream is varied to create spaces between the lumber pieces. The first group of transfers may be driven individually or ganged together. In one embodiment individual transfers or pairs of transfers are selectively and independently actuable to vary their speeds so that the gaps may be created, for example, by increasing the velocity of successive transfers in the downstream direction.

The transfers in the second grouping of transfers are individually driven. They maintain the gapping, that is the spacing between lumber pieces, and allow a surge capacity. Being individually driven, these transfers also provide for skew correction should the lumber pieces arrive skewed or skew during a transition from one transfer to another. These transfers gap and straighten the pieces as required so that one piece is positioned into each lug space on downstream lugged transfer chains. Thus, individually driven belts within this second grouping of transfers provide skew correction to correct the orientation of skewed lumber pieces on the infeed to the lugged transfer being loaded. Keeping the lumber pieces straight, that is oriented traversely across the flow path on the infeed, helps deal the lumber pieces into the lug spaces.

Dealing the boards directly into lug spaces without a mechanical lug loader simplifies the loading of the lug spaces in the lugged transfer as compared to the prior art. It improves operator access, and reduces the amount of mechanical components requiring maintenance.

In one aspect of the present invention, servo controlled decks singulate the lumber pieces and position them directly into a lugged chain.

In summary the virtual lug loader according to one aspect of the present invention includes a lug loader for loading workpieces in a flow direction into the spaced apart lugs on a lugged conveyor, wherein the workpieces are transversely oriented relative to the flow direction. The lug loader includes an array of pairs of endless conveyors for conveying the workpieces downstream, wherein each pair of endless conveyors in the array include first and second endless conveyors. The first and second endless conveyors are spaced laterally apart across the flow direction. Each are aligned substantially in the flow direction. The array forms a continuous upper surface in the flow direction for supporting the workpieces translating downstream in the flow direction. Each pair of endless conveyors in the array overlap adjacent pairs of endless conveyors in the array. At least one pair of endless conveyors in the array include independently actuable first and second drives independently driving their corresponding first and second endless conveyors.

When a skewed workpiece, that is one which is skewed from its transverse orientation, is translating on the first and second endless conveyors, the first or second drive corresponding to one of the pair of endless conveyors advances the upstream-most end of the workpiece relative to its downstream-most end to correct the workpiece to an un-skewed position oriented transversely to the flow direction.

The array may include an upstream gapping section and a downstream lug loading section. Advantageously, the first and second endless conveyors, that is the pair or pairs of conveyors which are independently actuable so as to correctly orient skewed workpieces, is or are found within the lug loading section. However, it is not intended as limiting the scope of the present invention to have only gapping sections followed by skew correction sections. It is intended that in the present invention also to interleaf gapping sections with skew correction pairs. Further, skew correction could be done anywhere within the transfer system instead of just the lug loading section.

The pairs of endless conveyors in the gapping section may translate the workpieces in the flow direction at increasing downstream velocities between an upstream end of the gapping section and a downstream end of the gapping section. The increasing downstream velocities may be successively increasing downstream velocities corresponding to successive pairs of endless conveyors between the upstream and downstream ends of the gapping section.

The number or proportion of endless conveyors either overall to the system, or within the lug loading section, which are the independently actuable pairs of endless conveyors may be for example, not intended to be limiting, substantially half of the number of pairs of endless conveyors.

The independently actuable pairs of endless conveyors each have corresponding selectively actuable drives so that each of those pairs of endless conveyors is asymmetrically actuable to drive one endless conveyor ahead of another endless conveyor to correct skew of a workpiece on any one of those endless conveyors.

The adjacent pairs of endless conveyors in the array may overlap at adjacent ends thereof by one endless conveyor of the adjacent pairs being inset laterally across the flow direction relative to a corresponding second endless conveyor of the adjacent pairs.

The present invention also is intended to include within its ambit a method of virtual lug loading corresponding substantially to the use of the above described apparatus.

DETAILED DESCRIPTION OF EMBODIMENTS OF THE INVENTION

Figures 1A, 1B, 1C:
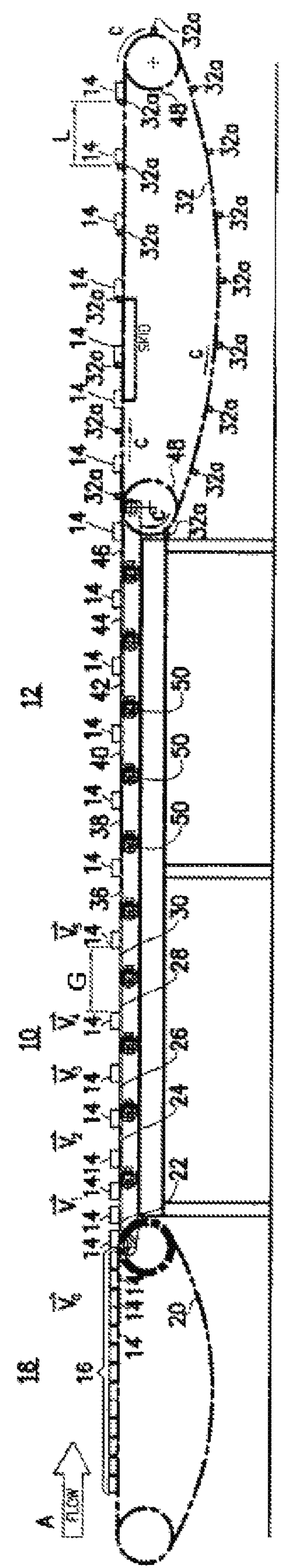
FIG. 1 is a side elevation view of the virtual lug loader according to the present invention shown in an elongated view having component views in FIGS. 1A, 1B and 1C intended to be viewed side-by-side in sequence.
Figures 2A, 2B, 2C:
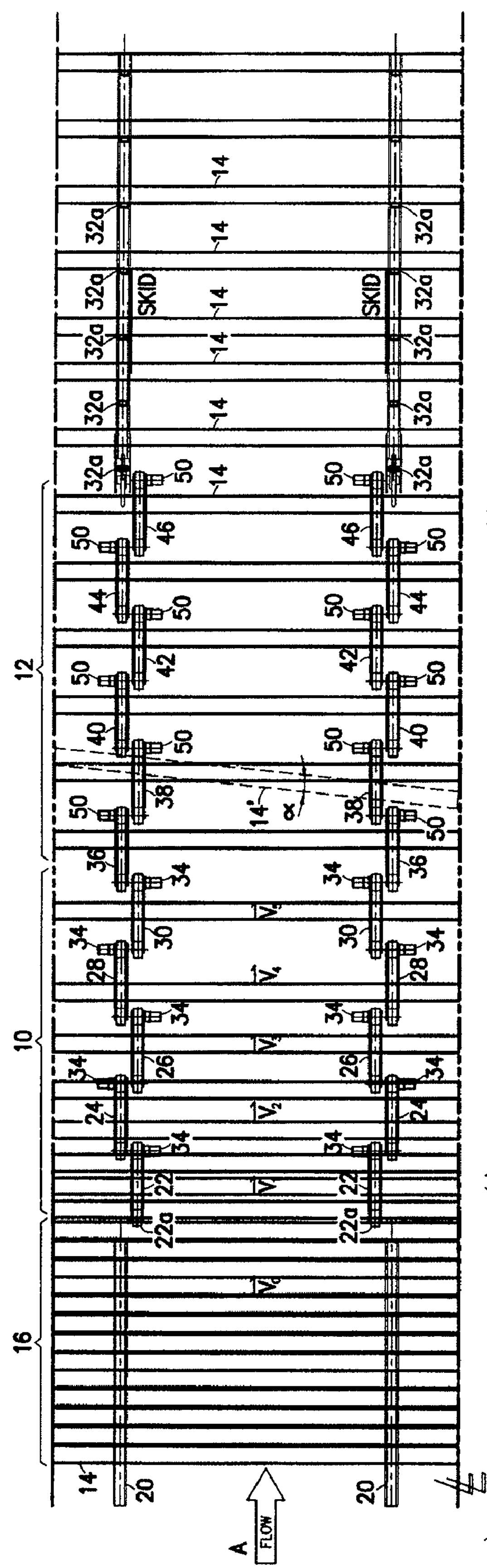
FIG. 2 is a plan view of the virtual lug loader of FIG. 1 shown in an elongated view having component views in FIGS. 2A, 2B and 2C intended to be viewed side-by-side in sequence.

As seen in the accompanying figures wherein similar characters of reference denote corresponding parts in each view, the Virtual Lug Loader according to the present invention includes a gapping section 10 immediately upstream, relative to a direction of flow A, of lug loading section 12. Workpieces 14 arrive in direction A so as to form a mat or blanket 16 of workpieces 14 on infeed transfer 18. Workpieces 14 arriving at the upstream end of infeed transfer 18 may be fed from, for example, a tilt hoist, a landing table, an unscrambler, or other wood handling machinery.

Mat 16 is formed on infeed transfer 18 as the workpieces are slowed on transfer belts at the downstream end of infeed transfer 18, workpieces 14 are urged onto the upstream ends 22*a* of a first pair of belts 22 for progressively faster translation of each workpiece 14 in direction A as the workpieces are transferred from the downstream end of infeed transfer 18 onto sequentially and progressively faster successive pairs of belts 22, 24, 26, 28, and 30 within gapping section 10. Gapping section 10 may, alternatively, may be thought of as a lumber separation zone. Thus, a workpiece 14 having a velocity Vo in direction A on infeed transfer 18, will, once handed off to the first pair of belts 22, have a downstream velocity V1, and then sequentially increasing velocities V2, V3, V4, V5 thereby sequentially increasing the separation between individual work pieces 14 by reason of the progressive acceleration of the boards between pairs of belts.

Advantageously, the separation between individual workpieces 14 is increased as the length of the gaps, distance G between adjacent workpieces is increased, for example to approximately one hundred twenty-five per cent of the length of each lug space, distance L, between lugs 32*a* of lugged outfeed chains 32. It is understood that, although five pairs of belts 22-30 are illustrated, it is not intended to limit the present invention to five pairs of belts in gapping section 10 as more or fewer pairs of belts will suffice so long as sequential workpieces 14 are separated in direction A so that the gap distance G is at least equal to lug space distance L.

The pairs of belts 22, 24, 26, 28 and 30 in gapping section 10 may each be driven by variable frequency drives or induction motors 34 along with associated gear heads. In the illustrated example, not intended to be limiting, each of the five speed-up zones corresponding to the five belt pairs are approximately sixteen inches long so that the length in the downstream direction of gapping section 10 is approximately six foot, eight inches.

In a preferred embodiment, lug loading section 12 is immediately downstream, and cooperates with, the downstream end of gapping section 10 so that workpieces 14 are smoothly handed off from belts 30, being the downstream most pair of belts in gapping section 10, to the first pair of control zone belts 36 located immediately downstream of the interface between gapping section 10 and lug loading section 12. Lug loading section 12 is a workpiece control zone wherein skew may be corrected such as the skew of a workpiece 14' illustrated in dotted outline on control zone belts 38. Skew correction is accomplished by each belt in each pair of control zone belts 36, 38, 40, 42, 44, and 46 being able and adapted to selectively operate at different speeds. In order to correct skew, for example a skew angle alpha (a) of a skewed workpiece 14 the two belts 38, and subsequent downstream belts as need be, are driven at different speeds relative to one another as board 14' passes over the belts, so that the lagging end of the board catches up with the advanced end of the board until the board is correctly positioned perpendicularly across the direction of flow A.

Apart from operating to correct the skew of workpieces translating downstream in direction A, the independently actuable control zone belts in the belt pairs of lug loading section 12 also, in addition to those belts in gapping section 10, operate to selectively space the boards apart and synchronize the boards with upcoming lugs 32*a* as the lugged outfeed chains 32 rotate in direction C. Thus the control zone belts are driven by a motion controller (not shown) to accelerate or decelerate pairs of belts 36, 48, 40, 42, 44 and 46 to simultaneously accelerate or decelerate both belts in individual pairs of belts so as to accelerate or decelerate a workpiece which has been corrected for a skew. This is done to synchronize and match the placement of a particular workpiece into, for example, the middle of a corresponding lug space as the workpiece exits the downstream end of lug loading section 12. Thus as may be seen, the acceleration or deceleration of the sequence of workpieces 14 being translated downstream over the sequential array of pairs of belts 38, 40, 42, 44 and 46, are selectively motion controlled so as to place a workpiece 14 entering onto the upstream end of the lugged outfeed chains 32 preferably into for example the middle of a corresponding lug space or otherwise exiting off the downstream end of belts 46 just after a pair of lugs 32*a* rotate to the vertical as chains 32 rotate endlessly around sprockets 48.

In the illustrated embodiment, not intended to be limiting, lug loading section 12 has six control zone belt pairs may be thought of as six belt modules each approximately sixteen inches long in the downstream direction for a total downstream length of eight feet. In one preferred embodiment, the motors 50 which selectively individually drive each belt in each belt module, may be servo motors having corresponding gear heads.

Figure 3:
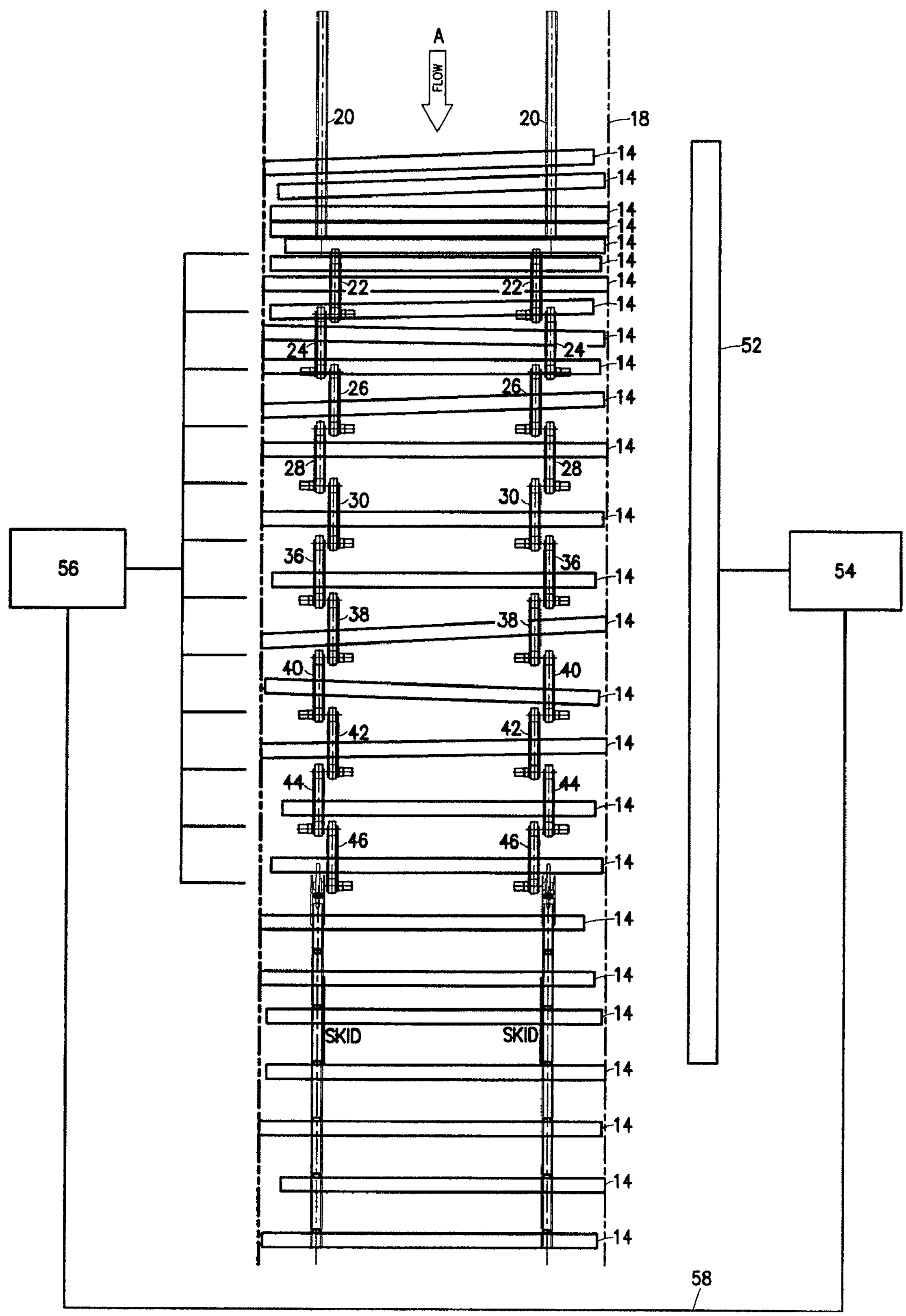
FIG. 3 is the lug loader of FIG. 2 showing, diagrammatically, sensors and controls.

It is understood that sensors 52 such as seen in FIG. 3 and known in the prior art, and as would be known to one skilled in the art, would be provided to detect the position of individual boards and that the information from the sensors is processed by a digital processor 54 cooperating with the sensors and that the digital processors also cooperates with a programmable logic controller (PLC) 56 via network 58 which in turn cooperates with the motors for selectively driving the belts 22, 24, 26, 28 and 30 in gapping section 10 and belts 36, 38, 40, 42, 44 and 46 in lug loading section 12.

In interpreting both the specification and the claims, all terms should be interpreted in the broadest possible manner consistent with the context. In particular, the terms "comprises" and "comprising" should be interpreted as referring to elements, components, or steps in a nonexclusive manner, indicating that the referenced elements, components, or steps maybe present, or utilized, or combined with other elements, components, or steps that are not expressly referenced.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A lug loader for loading workpieces, the lug loader comprising:

an array of pairs of endless conveyors, each pair of endless conveyors including a first and a second endless conveyor spaced laterally apart across a flow direction and substantially aligned in said flow direction, wherein said array forms a continuous upper surface for supporting a workpiece translating downstream in said flow direction, the pairs of endless conveyors overlapping in said flow direction, wherein at least some of the pairs of endless conveyors form a gapping section configured to adjust a gap distance between the workpiece and a next consecutive workpiece, the gapping section including a first and a second of the pairs of endless conveyors, the first of the pairs of endless conveyors configured to accelerate the workpiece from an initial velocity to a first velocity and the second of the pairs of endless conveyors configured to accelerate the workpiece to a second velocity greater than the first velocity, wherein the second of the pairs of endless conveyors is downstream of, and overlaps, the first of the pairs of endless conveyors.

2. The device of claim 1 wherein one or more pairs of endless conveyors of said array forms a lug loading section, wherein at least one of the one or more pairs of endless conveyors within said lug loading section includes independently actuable first and second drives independently driving corresponding said first and second endless conveyors, respectively.

3. The device of claim 2 wherein said at least one of the one or more pairs of endless conveyors in said lug loading section is configured to be selectively asymmetrically driven by the independently actuable first and second drives to adjust a skew angle of the workpiece.

4. The device of claim 3 wherein said least one of the one or more pairs of endless conveyors in said lug loading section is configured to be selectively symmetrically driven by the independently actuable first and second drives to cause acceleration or deceleration of the workpiece.

5. The device of claim 4, wherein the lug loading section includes a plurality of the pairs of endless conveyors, substantially half of the first and second endless conveyors in said lug loading section have corresponding selectively actuable drives, the corresponding selectively actuable drives selectively controlled to synchronize placement of the workpieces onto a transfer downstream of the lug loading second.

6. The device of claim 5 wherein the pairs of endless conveyors in said array overlap at adjacent ends thereof by one endless conveyor of said adjacent pairs being inset laterally across said flow direction relative to a corresponding second endless conveyor of said adjacent pairs.

7. A method for loading workpieces on a lugged conveyor having an array of pairs of endless conveyors, each pair of endless conveyors including a first and a second endless conveyor spaced laterally apart and substantially aligned in a flow direction, wherein said array forms a continuous upper surface in said flow direction for supporting the workpieces translating downstream in said flow direction, the method comprising;

a) creating gaps between the workpieces by driving a first of the pairs of endless conveyors at a first speed to accelerate the workpieces to a first velocity and driving a second of the pairs of endless conveyors at a second speed to accelerate the workpieces to a second velocity greater than the first velocity as they are translated downstream on the array, wherein the acceleration of the workpieces creates the gaps between the workpieces, and b) driving a third of the pairs of endless conveyors asymmetrically to correct a skew angle of at least one of the workpieces, wherein the third of the pairs of endless conveyors includes a first and a second independently actuable drives includes independently actuable first and second drives independently driving corresponding said first and second endless conveyors, respectively.

8. The method of claim 7 wherein said array includes gapping section and a lug loading section, wherein said first and second of the pairs of endless conveyors are within said gapping section and said third of the pairs of endless conveyors is within said lug loading section.

9. The method of claim 7 wherein said first and second of the pairs of endless conveyors in said gapping section translate the workpieces in said flow direction at increasing downstream velocities between an upstream end of said gapping section and a downstream end of said gapping section.

10. The method of claim 8 further including symmetrically driving at least one of the pairs of endless conveyors in the lug loading section at a selected speed to accelerate or decelerate said at least one of the workpieces after correction of the skew angle.

11. The method of claim 8 wherein the lug loading section includes a plurality of the pairs of endless conveyors, at least half of all said first and second endless conveyors of said pairs of endless conveyors in said lug loading section have corresponding selectively actuable drives, the corresponding selectively actuable drives selectively controlled to synchronize placement of the workpieces onto a transfer downstream of the lug loading section.

12. The method of claim 11 wherein the pairs of endless conveyors in said array overlap at adjacent ends thereof by one endless conveyor of said adjacent pairs being inset laterally across said flow direction relative to a corresponding second endless conveyor of said adjacent pairs.

* * * * *

UNITED STATES PATENT AND TRADEMARK OFFICE

CERTIFICATE OF CORRECTION

PATENT NO. : 7,938,247 B2
APPLICATION NO. : 12/534777
DATED : May 10, 2011
INVENTOR(S) : Darryl Kujat, Douglas Foster and Darren Ross It is certified that error appears in the above-identified patent and that said Letters Patent is hereby corrected as shown below:

In the Claims

Column 6, line 37, "… wherein said least one of …" should read --… wherein said at least one of …--.

Column 6, line 48, "… of the lug loading second." should read --… of the lug loading section.--.

Column 6, lines 60-61, "… the method comprising; …" should read --… the method comprising: …--.

Column 7, lines 6-9, "… wherein the third of the pairs of endless conveyors includes a first and a second independently actuable drives includes independently actuable first and second drives independently driving …" should read --… wherein the third of the pairs of endless conveyors includes independently actuable first and second drives independently driving …--.

Column 7, lines 11-12, "… includes gapping section …" should read --… includes a gapping section …--.

Signed and Sealed this
Seventeenth Day of March, 2015

Michelle K. Lee
*Director of the United States Patent and Trademark Office*